United States Patent [19]

Timmington

[11] Patent Number: 5,024,548

[45] Date of Patent: Jun. 18, 1991

[54] END FITTINGS FOR WIRE ROPE

[75] Inventor: David A. Timmington, Shatterford, United Kingdom

[73] Assignee: Griffin-Woodhouse Limited, United Kingdom

[21] Appl. No.: 545,402

[22] Filed: Jun. 28, 1990

[30] Foreign Application Priority Data

Jan. 4, 1990 [GB] United Kingdom ............... 9000128

[51] Int. Cl.[5] .................................................. F16D 1/12
[52] U.S. Cl. ...................................... 403/78; 403/165; 403/275
[58] Field of Search .................. 403/165, 275, 268, 78; 59/95

[56] References Cited

U.S. PATENT DOCUMENTS

| 853,706 | 5/1907 | Lindholm | 403/165 |
| 1,642,958 | 9/1927 | Joyner | 59/95 |
| 2,519,460 | 8/1950 | Hansen | 403/78 X |

Primary Examiner—Andrew V. Kundrat
Attorney, Agent, or Firm—Learman & McCulloch

[57] ABSTRACT

Swivelling end fitting for wire rope has a socket element (10) with the end of the rope (30) anchored in a divergent proximal bore portion (12) by splaying its strands therein and securing them with spelter. A distal portion (14) of said bore receives the shank of a terminal element (16) e.g. having an eye formation (18), said shank including a stem (20) terminating in a head (22) held captive but rotatable by a collar (24) round the stem and secured in the distal bore portion, typically by screw engagement with additional security by welding (32).

4 Claims, 2 Drawing Sheets

END FITTINGS FOR WIRE ROPE

This invention relates to end fittings for wire rope, particularly but not exclusively swivel eyes though the invention also extends to fittings having other swiveling terminal elements such as hooks, shackles or the like for linking the rope to some other object in use.

It is well known to provide a socketed end fitting which is permanently anchored to the end of the rope by the latter being received within a through bore of the fitting with the strands of the rope preferably being spread within a divergent part of said bore, the end being secured therein by running molten solder spelter into the bore through the end remote from the main part of the rope.

If a swivel connection linking the rope to some other object, e.g. an anchor, is required the usual known practice has been to connect a separate swivel link to an eye at the end of the rope by means of an intermediate shackle but such arrangement is unwieldy, requires at least three fittings with consequent increase in cost and weight; occupies a substantial length; is liable to kinking or tangling; and may give rise to increased risk of failure. There is also increased likelihood that an unsuitable combination of fittings may be used to "make do".

The object of the invention is provide end fittings for wire rope which themselves incorporate a swiveling facility in a particularly neat, compact and convenient form and with high reliability and durability.

According to the invention there is provided an end fitting for wire rope comprising a socket element having a longitudinal through bore, a proximal portion of said bore receiving an end part of the rope to be operatively secured therein by spelter in known manner; a terminal element having an eye or other formation for linking the rope to some other object in use and a shank having a stem and an increased diameter headed end accommodated within a distal portion of said bore on assembly; and a retaining collar to be secured in said distal portion in surrounding relationship to said stem whereby, after the rope has been secured in the socket element, the terminal element shank is captive in said bore while permitting rotation thereof in relation to the socket element.

Preferably said proximal end portion of the bore will diverge towards the distal portion enabling the strands of the rope to be splayed therein for most effective anchorage using spelter.

The collar preferably includes a threaded portion for screw-engagement in the distal portion of the bore and is preferably additionally secured on assembly by being welded to the socket element.

The collar may be split longitudinally into two parts so that it can be engaged about the stem of the shank before being secured to the socket element.

An example of the invention is now more particularly described with reference to the accompanying drawings wherein.

Figure 1:
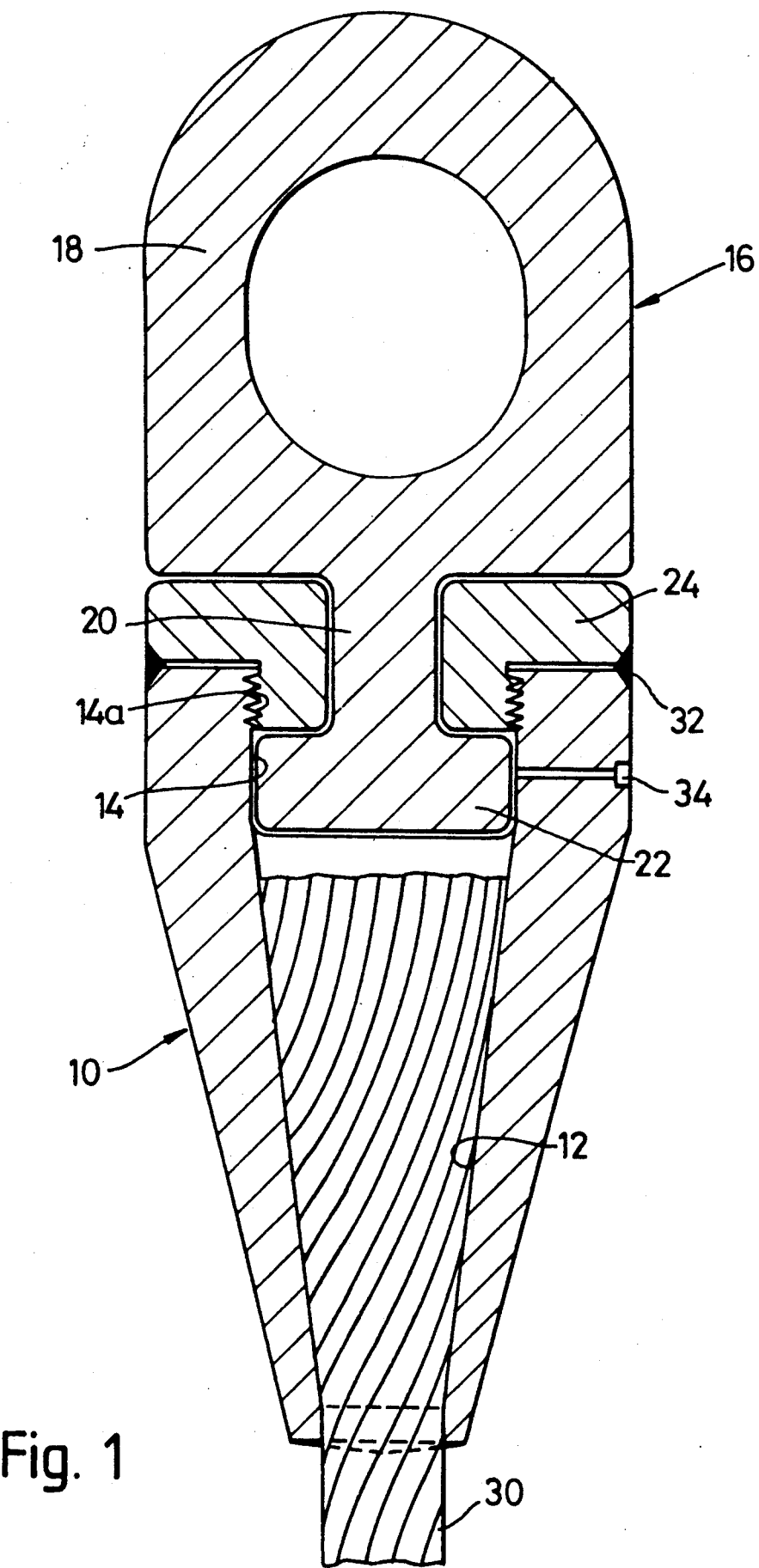
FIG. 1 is a section of an end fitting on an axial plane.
Figure 2:
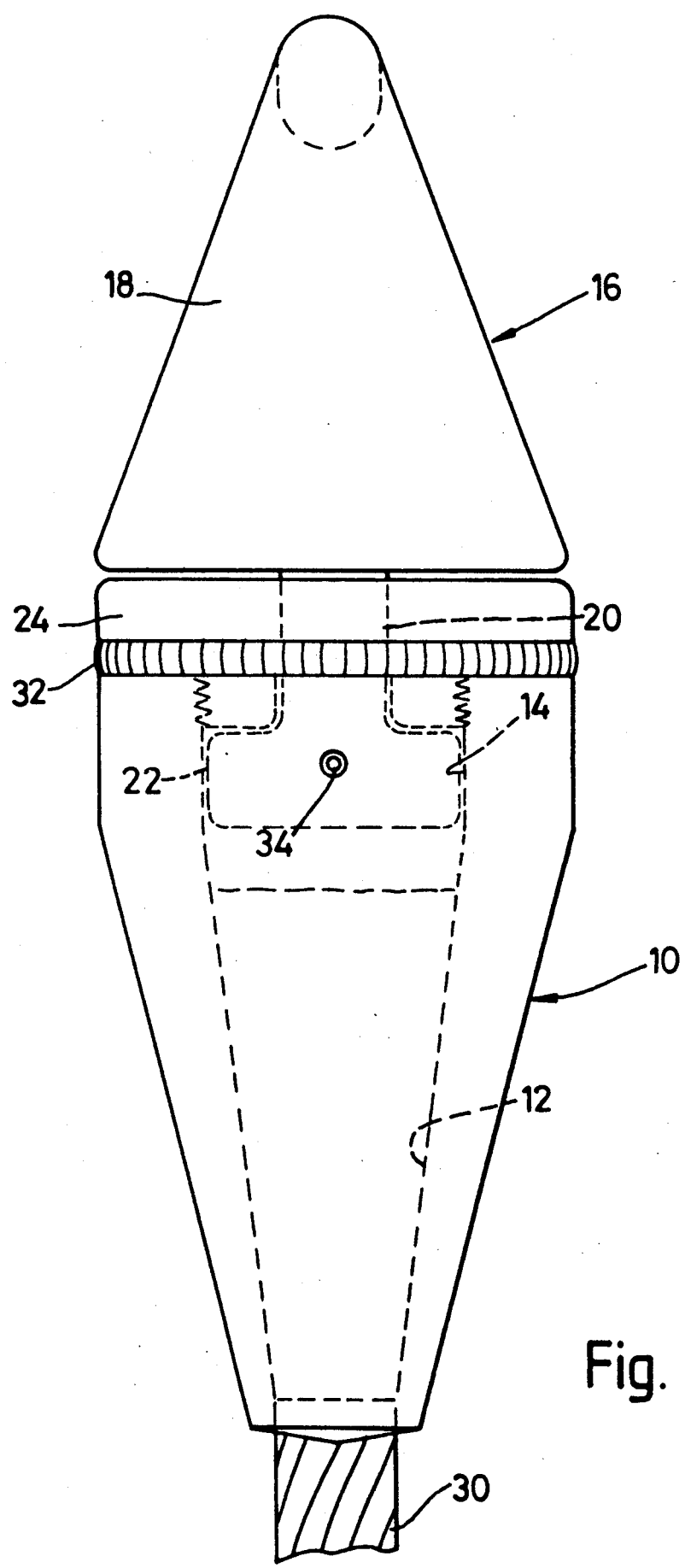
FIG. 2 is a side elevation thereof.

The end fitting comprises a frusto-conical socket element 10 having a longitudinal through bore, a proximal portion 12 of which diverges to merge with an increased diameter generally parallel distal portion 14 thereof. An end part 14a of the latter is provided with an internal screw-thread.

The fitting further comprises a terminal element 16, in this example including an eye formation 18 though other forms of formation are contemplated.

Element 16 further includes an integral shank having a stem 20 terminating in a substantially increased diameter headed end 22 which is a running fit in the distal portion 14 of the socket element bore.

A collar 24 of the fitting is formed in two halves split on an axial plane, on assembly it is a running fit around the stem 20 of element 16. On end of the collar is flanged to be equal in diameter to the mating portion of the socket element and a reduced diameter part of the collar is externally threaded for screw-engagement in the portion 14a of bore 12.

In use, with the parts of the fitting dis-assembled, the end of a wire rope 30 is first anchored in the proximal portion 12 of the socket element bore by having its strands splayed therein and secured by spelter in known manner with access for this purpose through the open distal portion of the bore.

Next the two parts of the collar 24 are assembled around the stem 20 of the terminal element shank and the collar is then screwed into bore portion 14a, thus retaining the stem of the terminal element captive while permitting the latter element to rotate co-axially with respect to the socket element 10 and rope 30.

Preferably the assembled fitting is permanently secured together by finally welding collar 24 to socket element 10 around the peripheral joint 32 therebetween.

Prior to assembly grease or other lubricant will be applied to the terminal element stem and, if required in service, further lubricant may be supplied through a grease nipple 34 in a side wall of element 10.

The assembled fitting is particularly strong and compact, neat in appearance, and the tapered exterior profiles of the socket element 10 and the eye formation 18, preferably shaped as shown in the drawings, makes snagging or fouling much less likely. There are no shackles or other intermediate linking elements to become tangled and the permanent attachment of the fitting to the rope ensures that the safe working load of the assembly is appropriate to the size and type of rope.

Having now described my invention what I claim is:

1. A swivel end fitting for wire rope comprising:
   (a) a terminal element having a distal end for linking the rope to an object in use and an integral shank shaped to provide a coaxial unitary stem and enlarged headed end;
   (b) a unitary socket element defining a longitudinal coaxial bore having a distal end portion to accommodate said headed end of said shank and a proximal end portion which converges in internal dimension away from said distal end portion for receiving an end of the rope to be operatively secured therein, said socket element having a distal end face proximate said distal end portion; and
   (c) a retaining collar having a threaded portion for threaded engagement in said distal end portion of the bore and a flange portion disposed adjacent the distal end face of the socket element when said threaded portion is in threaded engagement in said bore, the outer diameters of the flange portion and the distal end portion of the socket element and the distal end of the terminal element being the same and flush with each other, to avoid snagging and being exteriorly accessible on assembly of said collar and socket element, the collar being split longitudinally into separable parts to permit positioning thereof about the stem of the shank preparatory to said threaded engagement, whereby said threaded engagement retains the shank in swivelling relationship in said bore and couples the terminal element to the socket element while said flange portion remains accessible from the exterior of the swivel end fitting for tightening, inspection and secondary securing, if desired, of said retaining collar.

2. A fitting as in claim 1 wherein the distal end of the terminal element defines an eye.

3. A fitting as in claim 1 wherein said flange portion is welded to said socket element after assembly of the swivel end fitting to provide secondary securement of said collar.

4. A fitting as in claim 1 including means for applying a lubricant to the terminal element shank.

* * * * *